(12) United States Patent
Kase et al.

(10) Patent No.: US 9,855,974 B2
(45) Date of Patent: Jan. 2, 2018

(54) VEHICLE BODY STRUCTURE

(71) Applicant: HONDA MOTOR CO., LTD., Tokyo (JP)

(72) Inventors: Fumitoshi Kase, Wako (JP); Yoichiro Hamano, Wako (JP); Yasuyuki Shibata, Wako (JP); Makoto Kihara, Wako (JP); Misato Mineshima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/226,211

(22) Filed: Aug. 2, 2016

(65) Prior Publication Data

US 2017/0036704 A1 Feb. 9, 2017

(30) Foreign Application Priority Data

Aug. 3, 2015 (JP) ................................. 2015-153481

(51) Int. Cl.
*B62D 25/08* (2006.01)
*B62D 21/02* (2006.01)
*B60R 19/24* (2006.01)
*B60R 19/12* (2006.01)

(52) U.S. Cl.
CPC ............. *B62D 25/08* (2013.01); *B60R 19/12* (2013.01); *B60R 19/24* (2013.01); *B62D 21/02* (2013.01)

(58) Field of Classification Search
CPC ........ B62D 25/08; B62D 21/02; B60R 19/12; B60R 19/24
USPC ............ 293/154, 155, 102, 120; 296/187.09, 296/187.1
See application file for complete search history.

(56) References Cited

U.S. PATENT DOCUMENTS

2002/0113447 A1* 8/2002 Frank ...................... B60R 19/34
293/133
2006/0244274 A1* 11/2006 Frank ...................... B60R 19/24
293/155

FOREIGN PATENT DOCUMENTS

JP 4862499 B2 1/2012

* cited by examiner

*Primary Examiner* — Joseph D Pape
(74) *Attorney, Agent, or Firm* — Westerman, Hattori, Daniels & Adrian, LLP

(57) ABSTRACT

A body structure includes: a bumper beam extending in the vehicle width direction; a pair of front side frames separated from each other in the vehicle width direction; and a pair of bumper beam extensions provided between respective front ends of the pair of front side frames and the bumper beam. The bumper beam is connected to the pair of bumper beam extensions at positions lower than respective upper walls of the pair of front side frames; and each of front portions of the pair of bumper beam extensions includes a connection portion to which a rear wall of the bumper beam is connected, and an extension portion provided above the connection portion and extending toward the vehicle front above the bumper beam.

16 Claims, 6 Drawing Sheets

VEHICLE BODY STRUCTURE

TECHNICAL FIELD

The present invention relates to a vehicle body structure.

CROSS-REFERENCE OF RELATED APPLICATION

This application claims priority of Japanese Patent Application No. 2015-153481 filed in Japan on Aug. 3, 2015, the entire contents of which are incorporated herein by reference.

BACKGROUND OF THE INVENTION

In vehicles with relatively high vehicle height as typified by an SUV, the position of a bumper beam, also tends to be high. However, when the position of a bumper beam is too high, the bumper beam may not function effectively when the vehicle crashes into a vehicle with low vehicle height or other objects. As a structure for lowering the position of a bumper beam, Japanese Patent No. 4862499 discloses a vehicle having a mechanism for moving a bumper beam (bumper reinforcement) downward, according to a crash prediction result.

However, the structure becomes complex in the vehicle of Japanese Patent No. 4862499. As a structure for lowering the position of a bumper beam, a front side frame supporting the bumper beam may be arranged in a tilted or curved manner, so that if lowers toward the vehicle front. However, if the front side frame is tilted or curved, flexural load is likely to act strongly on the front side frame at the time of a frontal crash. In terms of energy absorption at the time of a frontal crash, a horizontally extending front side frame is more advantageous than a tilted or curved front side frame.

SUMMARY OF THE INVENTION

An objective of the present invention is to arrange a bumper beam in a lower position, while extending a front side frame in a more horizontal manner.

According to the present invention, there is provided a body structure including:

a bumper beam extending in the vehicle width direction;

a pair of front side frames separated from each other in the vehicle width direction; and a pair of bumper beam extensions provided between respective front ends of the pair of front side frames and the bumper beam, characterized in that:

the bumper beam is connected to the pair of bumper beam extensions at positions lower than respective upper walls of the pair of front side frames; and each of front portions of the pair of bumper beam extensions includes a connection portion to which a rear wall of the bumper beam is connected, and an extension portion provided above the connection portion, and extending toward the vehicle front above the bumper beam.

According to the present invention, a bumper beam can be arranged in a lower position, while extending a front side frame in a more horizontal manner.

Figure 1:
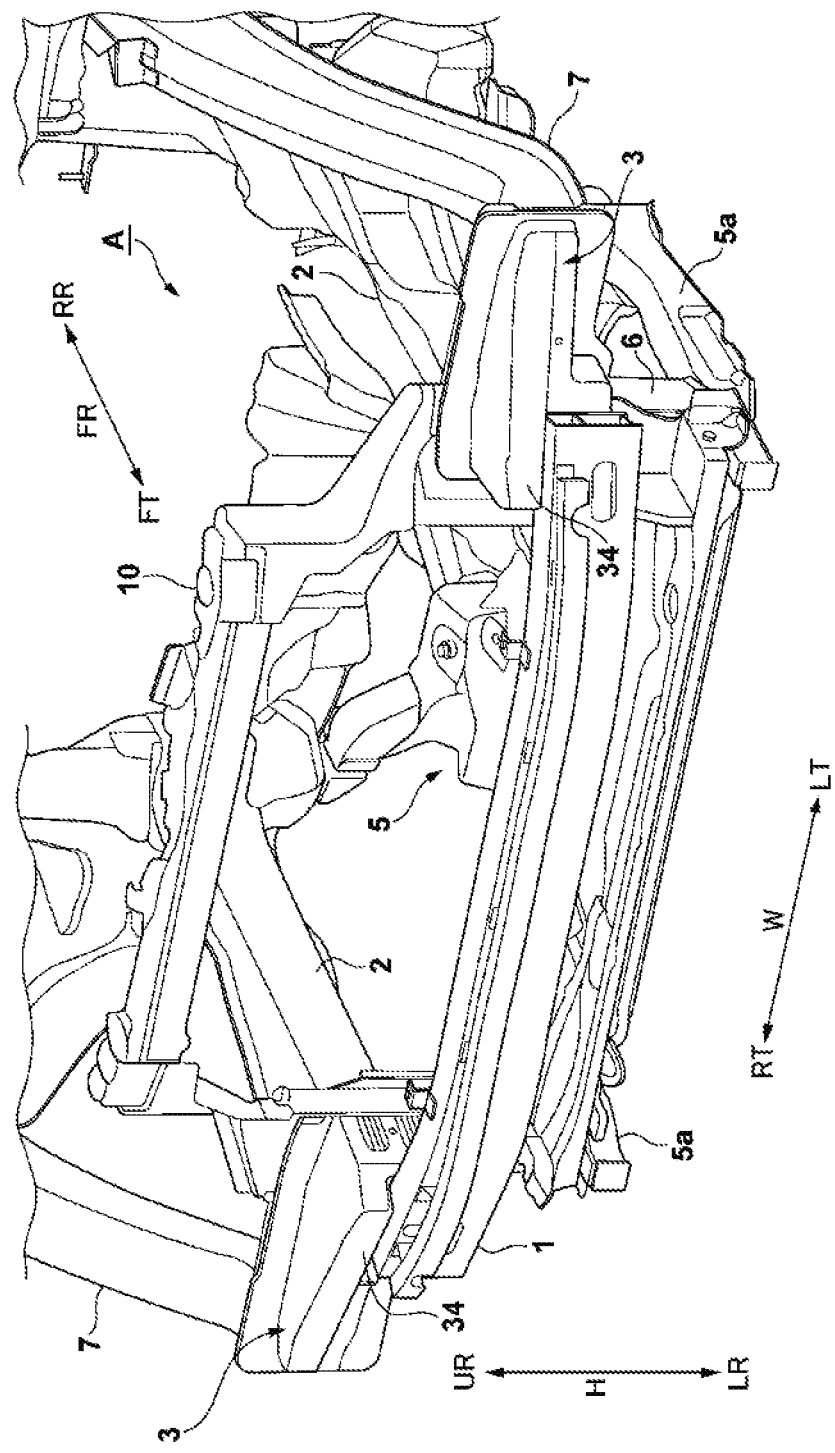
FIG. 1 is a perspective view of a body structure, according to an embodiment of the present invention.
Figure 4:
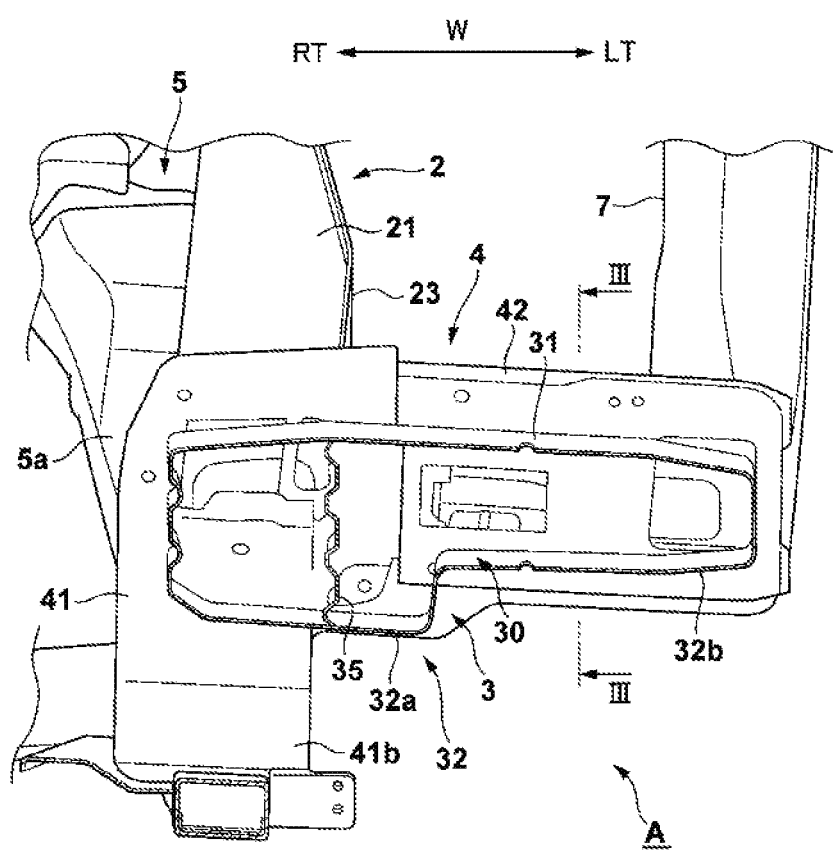
FIG. 4 is a diagram showing the cutaway view of FIG. 3 from a different viewpoint.
Figure 5A:
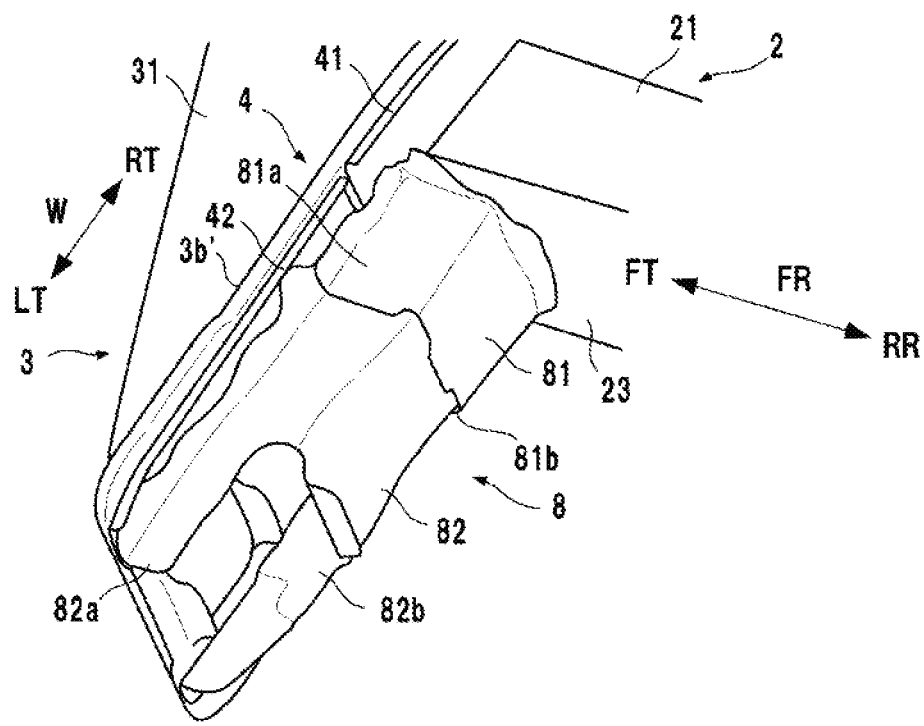
Figure 5B:
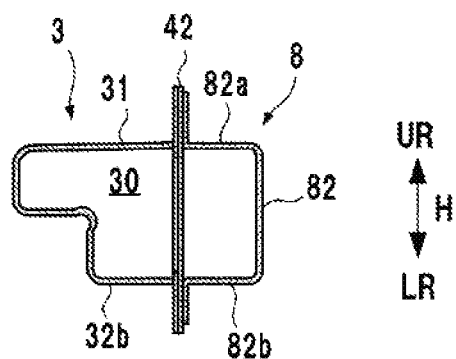

Part (A) of FIG. 5 is a partial perspective view of the body structure of FIG. 1, and part (B) of FIG. 5 is a cross-sectional view taken along line III-III of FIG. 4.

Figure 2:
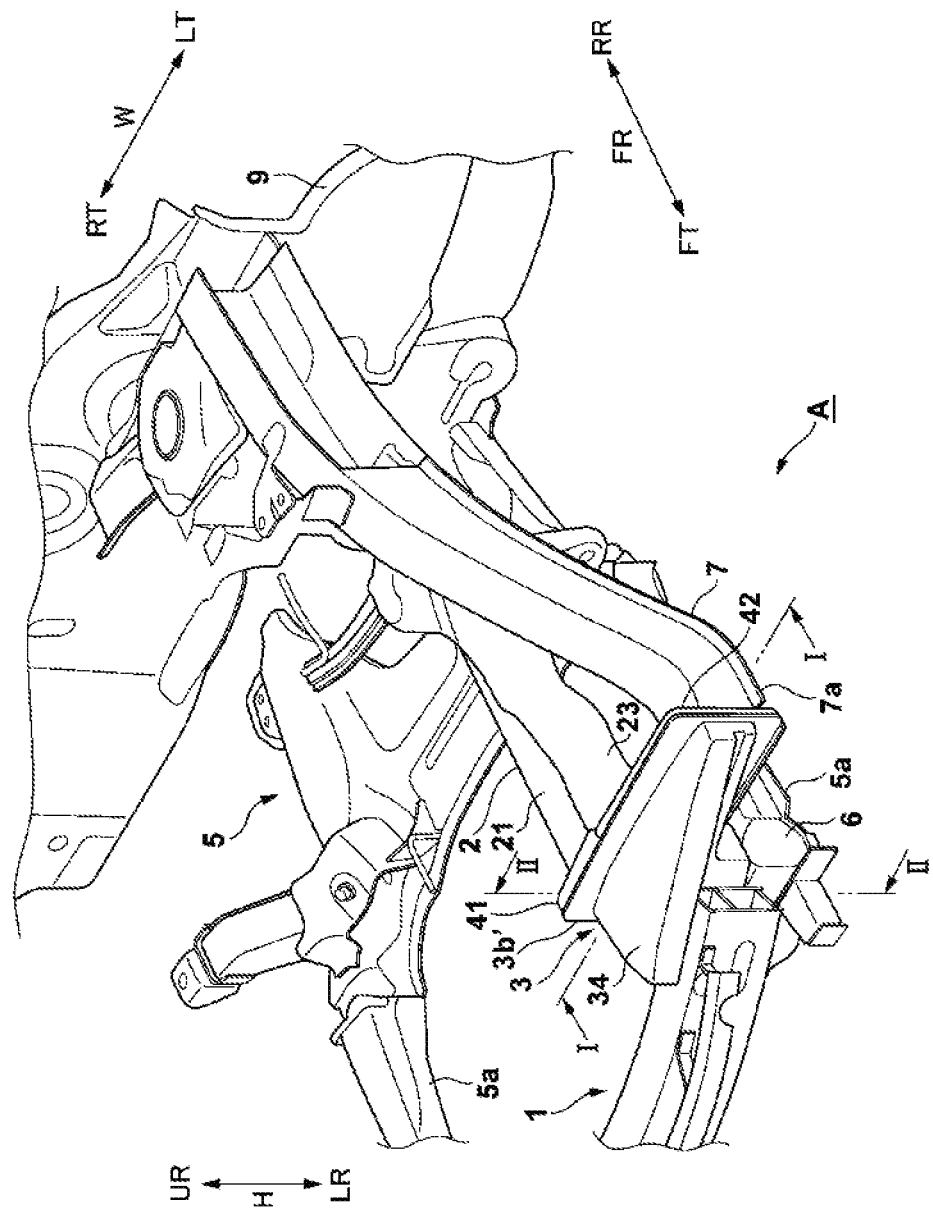
FIG. 2 is a partial perspective view of the body structure of FIG. 1.
Figures 6B, 6C:
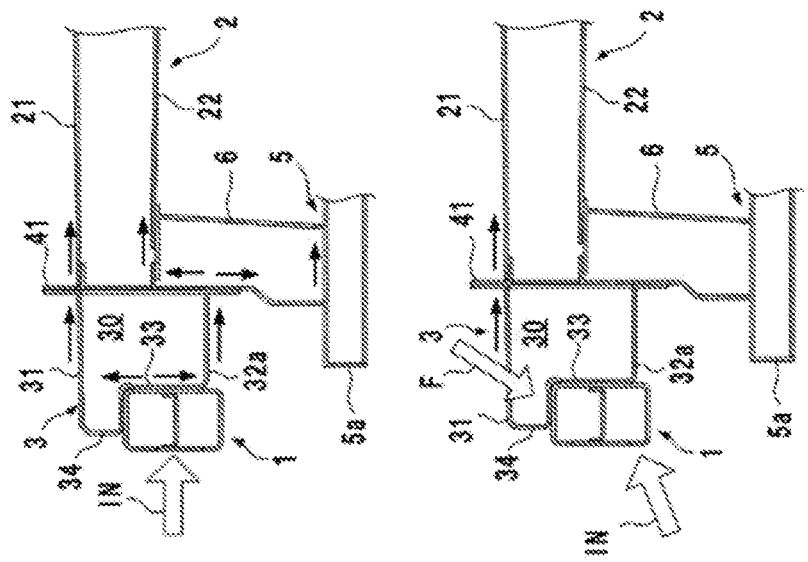

Part (A) of FIG. 6 is a cross-sectional view taken along line II-II of FIG. 2, and parts (B) and (C) of FIG. 6 are explanatory views showing how load is transmitted.

DETAILED DESCRIPTION OF THE INVENTION

Hereinafter, a body structure according to an embodiment of the present invention will be described. In the drawings, arrow FR indicates the longitudinal direction of the vehicle body, FT indicates the front, and RR indicates the rear. Arrow W indicates the vehicle width direction, and when viewed in the frontward traveling direction of the vehicle, LT indicates the left, and RT indicates the right. Arrow H indicates the vertical direction, UR indicates the upper direction, and LR indicates the lower direction.

<Overall Structure>

FIG. 1 is a perspective view of a body structure A. FIG. 2 is a partial perspective view showing mainly the left part of the body structure A. The body structure A is a structure constituting a front part of the vehicle body. The body structure A is applicable to general automobiles, but is advantageous in that the position of a bumper can be made relatively low in an automobile with relatively high vehicle height (e.g. SUV and four-wheel drive vehicle).

The body structure A includes a bumper beam 1, a pair of front side frames 2, a pair of bumper beam extensions 3, a subframe b, brackets 6, upper members 7, a dash panel 9 for separating an engine room and a cabin, and a front bulkhead 10.

The bumper beam 1 is a tubular member extending in the vehicle width direction, and in the embodiment, has right and left end parts slightly curving rearward in plan view. An unillustrated bumper face covers the front side of the bumper beam 1.

The pair of front side frames 2 are separated from each other in the vehicle width direction. Each front side frame 2 is a tubular member extending in the longitudinal direction. In the embodiment, each front side frame 2 extends substantially horizontally toward the vehicle front from the dash panel 9.

The pair of bumper beam extensions 3 are provided between the front, ends of the pair of front side frames 2 and the bumper beam 1. In the embodiment, an end part of the bumper beam 1 in the vehicle width direction and the front side frame 2 are connected through each bumper beam extension 3. The bumper beam extension 3 has a hollow structure, and absorbs impact energy by being crushed by impact load from the bumper beam 1 at the time of a frontal crash. As will be mentioned later, in the embodiment, the bumper beam extension 3 also has a function of lowering the position of the bumper beam 1, with respect to the front side frame 2.

The sub frame 5 is a frame for supporting an unillustrated suspension device, steering device, and other parts. The entire subframe 5 is arranged lower than the pair of front side frames 2. The subframe 5 includes a pair of longitudinally extending portions 5a separated in the vehicle width direction. The longitudinally extending portion 5a extends in the longitudinal direction of the vehicle body, in such a manner as to overlap with the front side frame 2 in the vertical direction. The connection bracket 6 connects the longitudinally extending portion 5a and the front side frame 2.

The pair of upper members 7 are separated from each other in the vehicle with direction, and are positioned outside the pair of front side frames 2 in the vehicle width direction. Each upper member 7 extends toward the vehicle front from the dash panel 9 while curving from upper to lower sides, and passing an area above an unillustrated wheel house. A base part of the upper member 7 on the dash panel 9 side is positioned higher than the front side frame 2, and a tip end part of the upper member on the vehicle front side is positioned at substantially the same height as the front side frame 2.

The front bulkhead 10 is a frame supported by the pair of front side frames 2, and supports auxiliary machinery such as a radiator. Note that the front bulkhead 10 is omitted from drawings other than FIG. 1.

<Structure of Bumper Beam Extension and its Periphery>

Figure 3:
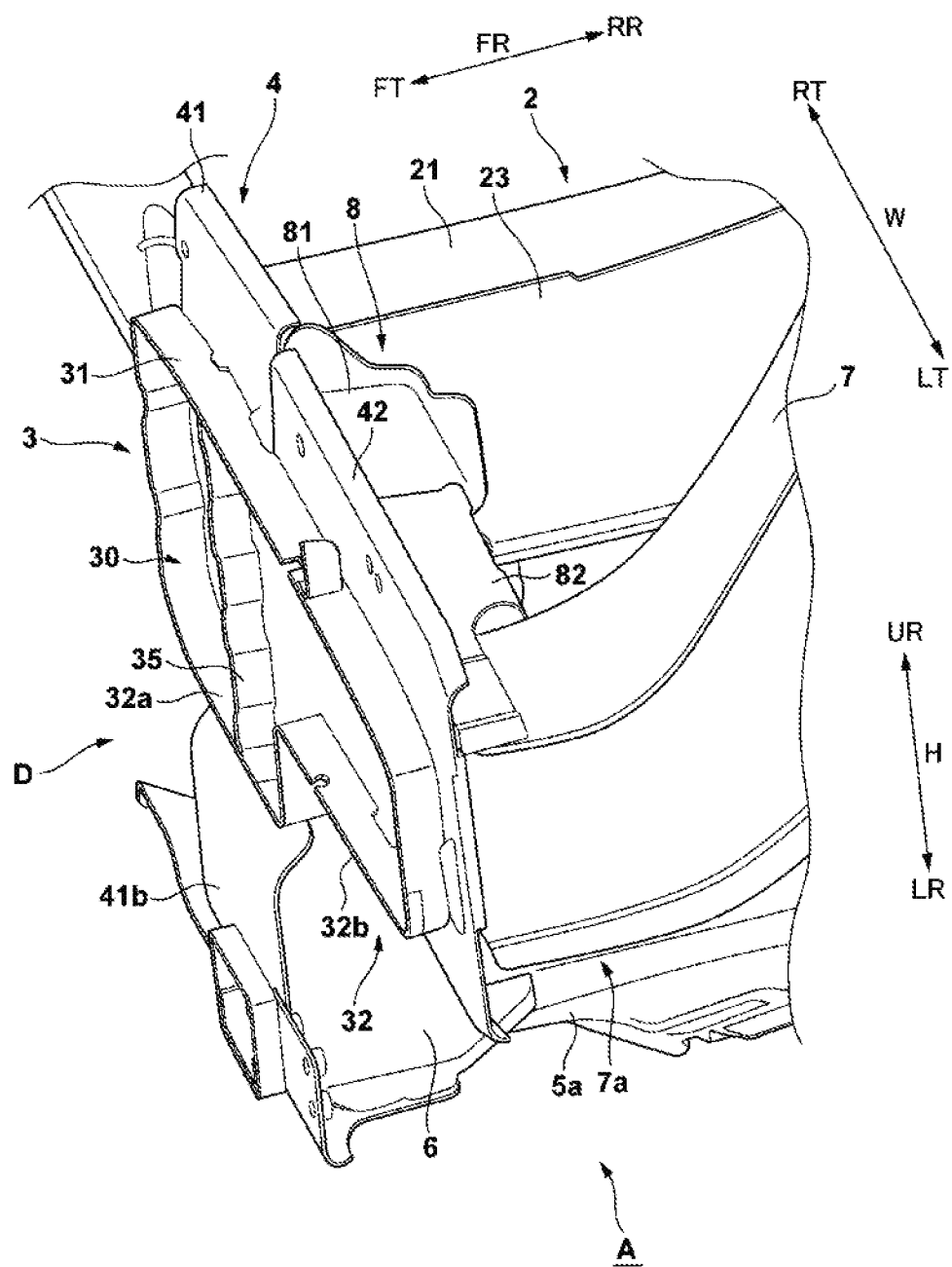
FIG. 3 is a partial perspective view of the body structure of FIG. 1, and is a cutaway view taken along line I-I of FIG.
Figure 6A:
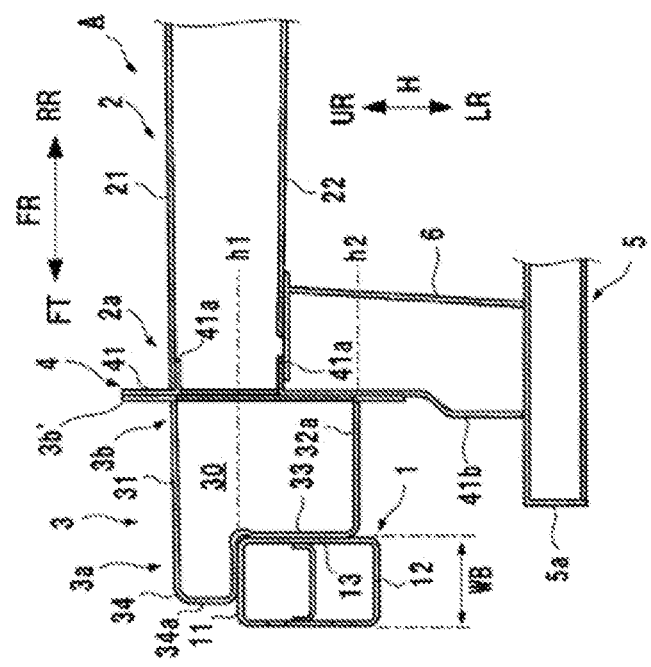

The structure of the bumper beam, extension 3 and its periphery will be described with reference to FIGS. 3, 4, and 6(A), as well as to FIGS. 1 and 2. FIG. 3 is a partial perspective view of the body structure A, and is a cutaway view taken along line I-I of FIG. 2. FIG. 3 is a diagram in which front parts of the bumper beam extension 3 and the longitudinally extending portion 5a of the sub frame 5 are cut along a vertical section, and a flange portion 3b' joined to the bumper beam extension 3 is omitted (made transparent). FIG. 4 is a diagram in which the structure shown in FIG. 3 is viewed in the direction of arrow D in FIG. 3. Part (A) of FIG. 6 is a cross-sectional view taken along line II-II of FIG. 2. Although the following description is given of the structure of the bumper extension 3 on the left side in the vehicle width direction, of the pair of bumper extensions 3, and its periphery, the same applies to the structure of the bumper extension 3 on the right side and its periphery.

First, a connection structure around the bumper beam extension 3 will be described. The outwardly extending plate shaped flange portion 3b' is joined to a rear portion 3b of the bumper beam extension 3, and a connection bracket 4 is fixed to the bumper beam extension 3 through the flange portion 3b'. In the following description, "the rear portion 3b is connected" means that it is connected through the flange portion 3b'.

The rear portion 3b of the bumper beam extension 3 is connected to the front side frame 2, connection bracket 6, and upper member 7, through the connection bracket 4. Although the connection bracket 4 may be configured of a single member, in the embodiment, it is configured of two members, which are connection members 41 and 42.

Both of the connection members 41 and 42 are plate shaped members, and are arranged side by side in the vehicle width direction. The connection member 41 is positioned on the inner side in the vehicle width direction, and the connection member 42 is positioned on the outer side in the vehicle width direction.

The connection member 41 extends vertically, and connects the rear portion 3b of the bumper beam extension 3 with the front end of the front side frame 2 and the connection bracket 6. The connection member 41 includes a part 41a that enters the inner side of the front side frame 2, and is fixed to the front side frame 2 by this part 41a.

The connection bracket 6 extends vertically, to vertically connect a front portion 2a of the front side frame 2 and the longitudinally extending portion 5a of the subframe 5. The connection bracket 6 is a member opened toward the front, and having a square horizontal section. The connection member 41 has a part 41b that closes a front part of the connection bracket 6, and the part 41b and the connection bracket 6 form a closed section. The bumper beam extension 3 is connected to the connection bracket 6 and the longitudinally extending portion 5a of the subframe 5, through the connection member 41.

The connection member 42 extends in the vehicle width direction, and connects the rear portion 3b of the bumper beam extension 3 with the front end of the upper member 7 and a connection bracket 8.

The connection bracket 8 extends to the right and left, to connect the front portion 2a of the front side frame 2 and a front portion 7a of the upper member 7 in the right-left direction. Although the connection bracket 8 may be configured of a single member, in the embodiment, it is configured of two members, which are an inner member 81 and an outer member 82. The connection bracket 8 will be described by also referring to part (A) of FIG. 5. Part (A) of FIG. 5 is a partial perspective view of the body structure A, and is a diagram in which the peripheral structure of the bumper beam extension 3 is viewed from the rear and the upper member 7 is omitted.

The inner member 81 and the outer member 82 are both members opened toward the front, and having a square horizontal section. The connection members 41 and 42 close front parts of the inner member 81 and the outer member 82, and the connection members 41 and 42, and the inner member 81 and the outer member 82 form closed sections. The inner member 81 and the outer member 82 are arranged side by side in the vehicle width direction, and are fixed to each other. The inner member 81 is positioned on the inner side in the vehicle width direction, and is fixed to a side wall 23 of the front side frame 2. The outer member 82 is positioned on the outer side in the vehicle width direction, and is fixed to the front portion 7a of the upper member 7.

With this structure, the bumper beam extension 3 is connected to the bumper beam 1, front side frame 2, subframe 5, and upper member 7, and can transmit impact load inputted to the bumper beam 1 to the front, side frame 2, subframe 5, and upper member 7.

Next, the configuration of the bumper beam extension 3 will be described. The bumper beam extension 3 is defined by a peripheral wall including an upper wall 31 and a bottom wall 32, and includes a hollow portion 30 opened toward the rear. The longitudinal width of the hollow portion 30 is longer as a whole on the inner side in the vehicle width direction, and is shorter as a whole on the outer side in the vehicle width direction. In other words, the volume of the hollow portion 30 is relatively large on the inner side in the vehicle width direction, and is relatively small on the outer side in the vehicle width direction, so that the volume of the hollow portion 30 is enlarged around the part where the bumper beam 1 is connected. Hence, an area to be crushed by impact load from the bumper beam 1 is secured and impact energy can be absorbed, without needlessly enlarging the bumper beam extension 3.

The entire upper wall 31 is provided to extend at the same height. Also, as can be seen from part (A) of FIG. 6, the upper wall 31 is continuous in height with an upper wall 21 of the front side frame 2. Since the upper wall 31 and the upper wall 21 are continuous in height with each other, load can be transmitted more effectively from the upper wall 31 to the upper wall 21, and impact load can be easily distributed over the entire front side frame 2. Note that "the upper wall 31 and the upper wall 21 are continuous" at least includes a configuration in which the upper wall 31 and the upper wall 21 have substantially the same height at end faces thereof, as in the example of part (A) of FIG. 6, and "the same height" includes that the respective end faces of the two walls at least partially overlap or aligned with each other in the view of horizontal direction.

The bottom wall 32 includes parts bent in the vehicle width direction, and having heights different from each other. To be specific, the bottom wall 32 includes a bottom wall 32a on the inner side in the vehicle width direction, and a bottom wall 32b on the outer side in the vehicle width direction. The bottom wall 32a is in a lower position, and enlarges the volume of the hollow portion 30 around the part where the bumper beam 1 is connected. Hence, an area to be crushed by impact load from the bumper beam 1 is secured and impact energy can be absorbed, without needlessly enlarging the bumper beam extension 3.

Also, as shown in part (A) of FIG. 6, the bottom wall 32a is positioned at a height h2 intersecting with the connection bracket 6. With this, load can be transmitted more effectively from the bottom wall 32a to the connection bracket 6, so that impact load can be transmitted to the subframe 5 through the connection bracket 6.

Next, the positional relation between the upper wall 31 and bottom wall 32b, and a connection member 82 will be described with reference to part (B) of FIG. 5. Part (B) of FIG. 5 is a cross-sectional view taken along line III-III of FIG. 4. As described earlier, the outer member 82 is a member opened toward the front and having a square horizontal section, and has an upper wall 82a and a bottom wall 82b. The upper wall 31 and the upper wall 82a are continuous with each other, while the bottom wall 32b and the bottom wall 82b are continuous with each other. Hence, load can be transmitted more effectively from the upper wall 31 to the upper wall 82a, and from the bottom wall 32b to the bottom wall 82b, so that impact load can be easily distributed over the front side frame 2 and the upper member 7.

Note that "the upper wall 31 and the upper wall 82a are continuous" at least includes a configuration in which the upper wall 31 and the upper wall 82a have the same height at end faces thereof, as in the example of part (A) of FIG. 5, and "the same height" includes that the respective end faces of the two walls at least partially overlap with each other. The same applies to the meaning of "the bottom wall 32b and the bottom wall 82b are continuous."

Also, the upper wall 31 of the bumper beam extension 3 and the upper wall of the connection bracket 8 may be entirely continuous, or may be partially continuous. The same applies to the relation between the bottom wall 32 and the bottom wall of the connection bracket 8.

Next, the hollow portion 30 has a partition wall 35 for partitioning its internal space into right and left parts. The partition wall 35 is a vertically extending wall, and is connected to the upper wall 31 and the bottom wall 32. As can be seen from FIG. 4, the partition wall 35 is continuous with the side wall 23 on the outer side in the vehicle width direction of the front side frame 2. This arrangement facilitates transmission of impact load from the partition wall 35 to the side wall 23, so that load can be transmitted more effectively from the bumper beam extension 3 to the front side frame 2. Note that "the partition wall 35 and the side wall 23 are continuous" at least includes a configuration in which the partition wall 35 and the side wall 23 are in the same position in the right-left direction at end faces thereof, as in the example of FIG. 4, and "the same position in the right-left direction" includes that the respective end faces of the two walls at least partially overlap with each other.

Next, the configuration of a front portion 3a of the bumper beam extension 3 will be described, by mainly referring to part (A) of FIG. 6. The front portion 3a includes a connection portion 33, and an extension portion 34 above the connection portion 33. A rear wall 13 of the bumper beam 1 is connected to the connection portion 33. An upper wall 11 of the bumper beam 1 is positioned at a height h1, and the bumper beam 1 is connected to the bumper beam extension 3 in a position lower than the upper wall 21 of the front side frame 2. Although the bottom wall 32a of the bumper beam extension 3 is in a higher position than a bottom wall 12 of the bumper beam 1 in this embodiment, it may be in the same or lower position.

As has been described, the bumper beam extension 3 also functions as a member for arranging the bumper beam 1 in a lower position, with respect to the front side frame 2. To lower the position of the bumper beam 1, the vertical width of the bumper beam 1 may be widened to extend it to a lower position. However, this will enlarge the bumper beam 1 and increase the weight of the vehicle. Alternatively, the front side frame 2 may be arranged in a tilted or curved manner, so that it lowers toward the vehicle front. However, flexural load is likely to act strongly on the front side frame at the time of a frontal crash. The structure of the embodiment allows the bumper beam 1 to be arranged in a lower position, while extending the front side frame 2 horizontally.

The extension portion 34 constitutes a part of the hollow portion 30, and extends toward the vehicle front above the bumper beam 1. The extension portion 34 may either be fixed or not fixed to the upper wall 11 of the bumper beam 1. A front end 34a of the extension portion 34 is positioned within a width WB of the bumper beam 1 in the longitudinal direction of the vehicle body, i.e., the vehicle rear-front direction. This is advantageous in that when covering the front side of the bumper beam 1 with the unillustrated bumper face, the extension portion 34 does not interfere with the bumper face, and does not block attachment thereof.

Since the extension portion 34 is provided, the area (volume) of the bumper beam extension 3 to be crushed at the time of a crash is enlarged, so that impact, energy can be absorbed more effectively. Moreover, the extension portion 34 is used to resist impact load on the bumper beam 1 from the obliquely lower direction, so that impact energy can be absorbed more effectively. By referring to parts (B) and (C) of FIG. 6, a description will be given of how load is transmitted when impact load is inputted to the bumper beam 1.

Part (B) of FIG. 6 exemplifies a case in which impact load is substantially horizontally inputted to the bumper beam 1, as indicated by arrow IN. The impact load is inputted to the bumper beam extension 3 through the connection portion 33, and while crushing the bumper beam extension 3, the impact load is transmitted to the front side frame 2, connection bracket 6, subframe 5, and the connection bracket 8 as well as the upper member 7 which are not shown in part (B) of FIG. 6, through the peripheral wall of the hollow portion 30 including the upper wall 31 and the bottom wall 32, as indicated by arrows in part (B) of FIG. 6. That is, impact load can be transmitted to the front side frame 2 and other parts and impact energy can be absorbed, even when the bumper beam 1 is arranged in a lower position by the bumper beam extension 3.

Part (C) of FIG. 6 exemplifies a case in which impact load is inputted to the bumper beam 1 from the obliquely lower direction, as indicated by arrow IN. Although the load is transmitted basically in the same manner as indicated in part (B) of FIG. 6, this case is different in that an upward load is added to the bumper beam 1. At this time, since the extension portion 34 is provided above the bumper beam 1, an upward shifting movement of the bumper beam 1 is resisted by the extension portion 34 pressed thereagainst, as indicated by arrow F. This can also prevent the bumper beam extension 3 from, toppling in the upper direction. The inputted impact load can be transmitted from the upper wall 31 to the upper wall 21 of the front side frame 2. Thus, impact energy imputed to the bumper beam 1 from the obliquely lower direction can be absorbed more effectively.

<Summary of Embodiment>

1. The body structure (such as A) of the above embodiment includes:

a bumper beam (such as 1) extending in the vehicle width direction;

a pair of front side frames (such as 2) separated from each other in the vehicle width direction; and a pair of bumper beam extensions (such as 3) provided between respective front ends of the pair of front side frames and the bumper beam, and is characterized in that:

the bumper beam is connected to the pair of bumper beam extensions at positions (such as h1 lower than respective upper walls (such as 21) of the pair of front side frames; and each of front portions (such as 3a) of the pair of bumper beam extensions includes a connection portion (such as 33) to which a rear wall (such as 13) of the bumper beam is connected, and an extension portion (such as 34) provided above the connection portion, and extending toward the vehicle front above the bumper beam.

According to this configuration, the bumper beam extension is interposed between the front side frame and the bumper beam, and the bumper beam is connected to the bumper beam extension at a position lower than respective upper walls of the pair of front side frames. Hence, the bumper beam can be arranged in a lower position while extending the front side frame in a more horizontal manner. Since impact load inputted to the bumper beam is inputted to the front side frame through the bumper beam extension, impact energy can be absorbed by the front side frame. Also, the extension portion can be used to resist impact load on the bumper beam from the obliquely lower direction, so that impact energy can be absorbed more effectively. Moreover, since the extension portion is provided, an area of the bumper beam extension to be crushed is enlarged as a whole, and impact energy can be absorbed more effectively.

2. The body structure (such as A) of the above embodiment is characterized in that the pair of bumper beam extensions are provided such that their upper walls (such as 31) are continuous with upper walls (such as 21) of the pair of front side frames, respectively.

According to this configuration, load is transmitted more effectively from the upper wall of the bumper beam extension to the upper wall of the front side frame, and impact load can be easily distributed over the entire front side frame.

3. The body structure (such as A) of the above embodiment further includes:

a subframe (such as 5) arranged lower than the pair of front side frames; and a pair of vertical connection brackets (such as 6) connecting respective front portions of the pair of front side frames and the subframe, and is characterized in that:

each of rear portions (such as 3b) of the pair of bumper beam extensions is connected to one of the pair of front side frames and one of the pair of vertical connection brackets; and each of bottom walls (such as 32) of the pair of bumper beam extensions is positioned at a height (such as h2) intersecting with the pair of vertical connection brackets.

According to this configuration, impact load can be transmitted from the bumper beam extension to the subframe through the vertical connection bracket, so that impact energy can be absorbed more effectively.

4. The body structure (such as A) of the above embodiment further includes a pair of upper members (such as 7) positioned outside the pair of front side frames in the vehicle width direction, and separated from each other in the vehicle width direction, and is characterized in that the pair of bumper beam extensions are connected to the front ends of the pair of upper members, According to this configuration, impact load can be transmitted from the bumper beam extension to the upper member, so that impact energy can be absorbed more effectively.

5. The body structure (such as A) of the above embodiment further includes a pair of right-left connection brackets (such as 8) connecting front portions (such as 2a) of the pair of front side frames and front portions (such as 7a) of the pair of upper members, respectively, and is characterized in that:

each of upper walls (such as 31) of the pair of bumper beam extensions at least includes a part where it is continuous with a corresponding one of upper walls (such as 81a and 82a) of the pair of right-left connection brackets; and each of bottom walls (such as 32) of the pair of bumper beam extensions at least includes a part (such as 32b) where it is continuous with a corresponding one of bottom walls (such as 82b) of the pair of right-left connection brackets.

According to this configuration, load is transmitted more effectively from the upper wall and the bottom wall of the bumper beam extension to the upper wall and the bottom wall of the right-left connection bracket, so that load can be transmitted more effectively to the front side frame and the upper member.

6. The body structure (such as A) of the above embodiment is characterized in that:

each of the pair of bumper beam extensions includes a partition wall (such as 35) for partitioning its internal space; and each of the partition walls is continuous with a corresponding one of outer side walls (such as 23) of the pair of front side frames.

According to this configuration, impact load is transmitted from the partition wall to the outer side wall, so that load can be transmitted more effectively from the bumper beam extension to the front side frame.

7. The body structure (such as A) of the above embodiment is characterized in that a front end (such as 34a) of the extension portion is positioned within a width (such as WB) of the bumper beam in the longitudinal direction of the vehicle body.

According to this configuration, interference between the extension portion and an external member attached to the bumper beam can be prevented.

DESCRIPTION OF REFERENCE NUMERALS

A body structure, 1 bumper beam, 2 front side frame, 3 bumper beam extension, 33 connection portion, 34 extension portion

The invention claimed is:

1. A vehicle body structure comprising:
a pair of front side frames extending in a vehicle rear-front direction and located apart from each other in a vehicle width direction;
a pair of bumper beam extensions having respective front sides and rear sides in the vehicle width direction and at the rear sides thereof connected to respective front ends of the pair of front side frames;
a bumper beam extending in the vehicle width direction and having a rear wall that is connected to the pair of bumper beam extensions at the front sides thereof such that the pair of bumper beam extensions are located between the respective front ends of said pair of front side frames and said bumper beam;
a subframe arranged at a position lower than said pair of front side frames; and
a pair of vertical connection brackets connecting respective lower front portions of said pair of front side frames and said subframe, each of said pair of bumper beam extensions at their rear sides being connected to one of the respective front ends of said pair of front side frames and one of said pair of vertical connection brackets such that each of bottom walls of said pair of bumper beam extensions is positioned at a height intersecting with said pair of vertical connection brackets, wherein
positions at which said bumper beam is connected to said pair of bumper beam extensions are lower than respective upper walls of said pair of front side frames in a vertical direction, and
each of said pair of bumper beam extensions at their front sides comprises,
a connection portion to which the rear wall of said bumper beam is connected, and
an extension portion provided above said connection portion and extending in the vehicle rear-front direction toward a vehicle front side above said bumper beam.

2. The vehicle body structure according to claim 1, wherein
said pair of bumper beam extensions are provided such that their upper walls are positioned at a height corresponding to the upper walls of said pair of front side frames in the vertical direction, respectively.

3. The vehicle body structure according to claim 1, further comprising:
a pair of upper members extending in the vehicle rear-front direction and located at positions apart from each other in the vehicle width direction and outside said pair of front side frames in the vehicle width direction, wherein
said pair of bumper beam extensions are connected at their rear sides to front ends of said pair of upper members.

4. The vehicle body structure according to claim 3, further comprising:
a pair of right-left connection brackets connecting front portions of said pair of front side frames and front portions of said pair of upper members, respectively, wherein
each of upper walls of said pair of bumper beam extensions at least in part is positioned at a height corresponding to one of upper walls of said pair of right-left connection brackets in the vertical direction, and
each of bottom walls of said pair of bumper beam extensions at least in part is positioned at a height corresponding to one of bottom walls of said pair of right-left connection brackets in the vertical direction.

5. The vehicle body structure according to of claim 1, wherein
each of said pair of bumper beam extensions has a partition wall for partitioning its inner space, and
each of said partition walls is positioned at a location corresponding to one of outer side walls of said pair of front side frames.

6. The vehicle body structure according to claim 1, wherein
a front end of said extension portion is positioned within a width of said bumper beam in the vehicle rear-front direction.

7. A vehicle body structure comprising:
a pair of front side frames extending in a vehicle rear-front direction and located apart from each other in a vehicle width direction;
a pair of bumper beam extensions having respective front sides and rear sides in the vehicle width direction and at the rear sides thereof connected to respective front ends of the pair of front side frames;
a bumper beam extending in the vehicle width direction and having a rear wall that is connected to the pair of bumper beam extensions at the front sides thereof such that the pair of bumper beam extensions are located between the respective front ends of said pair of front side frames and said bumper beam; and
a pair of upper members extending in the vehicle rear-front direction and located at positions apart from each other in the vehicle width direction and outside said pair of front side frames in the vehicle width direction, said pair of bumper beam extensions being connected at their rear sides to front ends of said pair of upper members, wherein
positions at which said bumper beam is connected to said pair of bumper beam extensions are lower than respective upper walls of said pair of front side frames in a vertical direction, and
each of said pair of bumper beam extensions at their front sides comprises,
a connection portion to which the rear wall of said bumper beam is connected, and
an extension portion provided above said connection portion and extending in the vehicle rear-front direction toward a vehicle front side above said bumper beam.

8. The vehicle body structure according to claim 7, wherein
said pair of bumper beam extensions are provided such that their upper walls are positioned at a height corresponding to the upper walls of said pair of front side frames in the vertical direction, respectively.

9. The vehicle body structure according to claim 7, further comprising:
a pair of right-left connection brackets connecting front portions of said pair of front side frames and front portions of said pair of upper members, respectively, wherein
each of upper walls of said pair of bumper beam extensions at least in part is positioned at a height corresponding to one of upper walls of said pair of right-left connection brackets in the vertical direction, and
each of bottom walls of said pair of bumper beam extensions at least in part is positioned at a height corresponding to one of bottom walls of said pair of right-left connection brackets in the vertical direction.

10. The vehicle body structure according to of claim 7, wherein
   each of said pair of bumper beam extensions has a partition wall for partitioning its inner space, and
   each of said partition walls is positioned at a location corresponding to one of outer side walls of said pair of front side frames.

11. The vehicle body structure according to claim 7, wherein
   a front end of said extension portion is positioned within a width of said bumper beam in the vehicle rear-front direction.

12. A vehicle body structure comprising:
   a pair of front side frames extending in a vehicle rear-front direction and located apart from each other in a vehicle width direction;
   a pair of bumper beam extensions having respective front sides and rear sides in the vehicle width direction and at the rear sides thereof connected to respective front ends of the pair of front side frames;
   a bumper beam extending in the vehicle width direction and having a rear wall that is connected to the pair of bumper beam extensions at the front sides thereof such that the pair of bumper beam extensions are located between the respective front ends of said pair of front side frames and said bumper beam; and
   a pair of upper members extending in the vehicle rear-front direction and located at positions apart from each other in the vehicle width direction and outside said pair of front side frames in the vehicle width direction, said pair of bumper beam extensions being respectively disposed in front of said pair of front side frames and said pair of upper members, wherein
   positions at which said bumper beam is connected to said pair of bumper beam extensions are lower than respective upper walls of said pair of front side frames in a vertical direction, and
   each of said pair of bumper beam extensions at their front sides comprises,
      a connection portion to which the rear wall of said bumper beam is connected, and
      an extension portion provided above said connection portion and extending in the vehicle rear-front direction toward a vehicle front side above said bumper beam.

13. The vehicle body structure according to claim 12, wherein
   said pair of bumper beam extensions are provided such that their upper walls are positioned at a height corresponding to the upper walls of said pair of front side frames in the vertical direction, respectively.

14. The vehicle body structure according to claim 12, further comprising:
   a pair of right-left connection brackets connecting front portions of said pair of front side frames and front portions of said pair of upper members, respectively, wherein
   each of upper walls of said pair of bumper beam extensions at least in part is positioned at a height corresponding to one of upper walls of said pair of right-left connection brackets in the vertical direction, and
   each of bottom walls of said pair of bumper beam extensions at least in part is positioned at a height corresponding to one of bottom walls of said pair of right-left connection brackets in the vertical direction.

15. The vehicle body structure according to of claim 12, wherein
   each of said pair of bumper beam extensions has a partition wall for partitioning its inner space, and
   each of said partition walls is positioned at a location corresponding to one of outer side walls of said pair of front side frames.

16. The vehicle body structure according to claim 12, wherein
   a front end of said extension portion is positioned within a width of said bumper beam in the vehicle rear-front direction.

* * * * *